(12) United States Patent
Dix et al.

(10) Patent No.: US 7,689,356 B2
(45) Date of Patent: Mar. 30, 2010

(54) METHOD AND APPARATUS FOR CREATING CURVED SWATH PATTERNS FOR FARM MACHINERY

(75) Inventors: Peter J. Dix, Naperville, IL (US); Bingcheng Ni, Naperville, IL (US); Kousha Moaveninejad, Chicago, IL (US)

(73) Assignee: CNH America LLC, New Holland, PA (US)

( * ) Notice: Subject to any disclaimer, the term of this patent is extended or adjusted under 35 U.S.C. 154(b) by 824 days.

(21) Appl. No.: 11/553,958

(22) Filed: Oct. 27, 2006

(65) Prior Publication Data

US 2008/0103694 A1     May 1, 2008

(51) Int. Cl.
*G01C 21/00* (2006.01)
*G06F 7/70* (2006.01)

(52) U.S. Cl. .................. 701/213; 701/205; 701/210; 701/206; 701/208; 701/50; 340/588; 340/990; 340/178

(58) Field of Classification Search .................. 701/213, 701/200, 50; 340/588, 990, 178
See application file for complete search history.

(56) References Cited

U.S. PATENT DOCUMENTS

| | | | |
|---|---|---|---|
| 5,987,383 | A | 11/1999 | Keller et al. |
| 5,995,902 | A | 11/1999 | Monson |
| 6,199,000 | B1 | 3/2001 | Keller et al. |
| 6,236,924 | B1 | 5/2001 | Motz et al. |
| 6,377,889 | B1 | 4/2002 | Soest |
| 6,463,374 | B1 | 10/2002 | Keller et al. |
| 6,501,422 | B1 | 12/2002 | Nichols |
| 6,549,849 | B2 | 4/2003 | Lange et al. |
| 6,553,299 | B1 | 4/2003 | Keller et al. |
| 6,643,576 | B1 | 11/2003 | O Connor et al. |
| 6,711,501 | B2 | 3/2004 | McClure et al. |
| 6,865,465 | B2 | 3/2005 | McClure |
| 6,934,615 | B2 | 8/2005 | Flann et al. |
| 2004/0186644 | A1 | 9/2004 | McClure et al. |
| 2005/0197757 | A1 | 9/2005 | Flann et al. |
| 2005/0197766 | A1 | 9/2005 | Flann et al. |
| 2006/0178820 | A1 | 8/2006 | Eglington et al. |

*Primary Examiner*—Khoi Tran
*Assistant Examiner*—Bhavesh V Amin
(74) *Attorney, Agent, or Firm*—Patrick M. Sheldrake; John William Stader; Michael G. Harms (57) ABSTRACT

A method for defining, using, and adjusting curved swath patterns and a swath generation apparatus implementing said method for use in an automated vehicle guidance system.

37 Claims, 9 Drawing Sheets

STRAIGHT LINE PARALLEL GUIDANCE PATTERN

HEADLAND PARALLEL GUIDANCE PATTERN

FIG. 9

SPIRAL GUIDANCE PATTERN

FIG. 10

METHOD AND APPARATUS FOR CREATING CURVED SWATH PATTERNS FOR FARM MACHINERY

BACKGROUND OF THE INVENTION

The present invention relates generally to GPS-based vehicle guidance systems and more particularly to a method and apparatus for creating curved swath paths that define a desired swath pattern to cover a field.

Tractors and other off-road work vehicles in the agricultural, mining and construction industries have typically operated with manual steering by the operator. Recent changes in control systems and the development of satellite-based navigation (GPS) systems, including those incorporating differential correction systems, have allowed tractors to operate in semi-automatic or fully automatic steering modes. Combining satellite navigation and ground-based navigation input signals precisely identifying vehicle position and speed with sophisticated on-board vehicle electronic control systems allow the tractor to steer itself with a high degree of accuracy when traversing terrain. The result is that precision farming practices are transitioning from a luxury to a necessity, capable of improving efficiency and yield in common farming operations, such as tilling, seeding, fertilizing, spraying and harvesting.

To provide this control, the prior art teaches using satellite positioning information by an on-board vehicle navigation control system to accurately determine and control a vehicle's position while operating in a field. The operator will typically enter the planned route of the tractor, or let the control system determine the most efficient route. The control methods are well known in the art, and may involve multiple position transmitters or receivers, with various signals used to derive vehicle location, elevation, direction of travel (vehicle heading), attitude, and speed.

The task of precision guidance of an agricultural vehicle involves not only accurately determining vehicle position in a field, but also defining an efficient array of paths to be followed by the vehicle that will, in conjunction with the swath of an associated implement, create an overall swath pattern that efficiently and effectively covers the crop area of a field. The pattern must be located and oriented on the field, and the physical characteristics and limitations of the vehicle and coupled implement must be identified and provided to the navigation system. Implement or header width, location of the implement or header with respect to the vehicle, and limitations on vehicle and associated implement movement, such as minimum turning radius, must also be considered. With this information it is possible to define a series of swath paths for the vehicle to travel in an attempt to cover all cultivatable portions of a field without unnecessary gaps or overlaps.

Calculating the series of paths needed to cover an area without substantial gaps or overlaps is relatively straightforward when straight paths can be used; however, not all fields can be covered in this manner. Many fields require the use of paths having a curvature that varies along at least some portion of its length, whether to follow irregularly shaped boundaries, avoid obstacles within the field follow topographic contours of the ground, implement agronomic farming practices, or to contour the ground for irrigation. Such conditions preclude a complete reliance on geometrically predefined paths, such as straight lines or constant radius curves. In order to provide generally equally spaced swaths, the path of each adjacent swath must change slightly compared to the prior swath path as the vehicle moves generally transversely across the field (i.e., from one swath to the next) the radius of each curved portion of the swath path varies slightly from the adjacent swath path.

Vehicle navigation systems must be able to store and retrieve swath path information as well as determine new adjacent swath paths from a baseline swath path or create new swath paths from defined starting and ending positions. The number of swath paths to be stored and/or determined increases as the size of the field increases. For swath paths that include variable curvature along their length, the number of positional data points necessary to fully define the swath path between starting and ending points is significantly increased compared to using only starting and ending position points to create straight-line paths. The systems must also quickly present swath path and control information to the operator in an easily understood and useful manner, which requires computational efficiency. As the vehicle operator positions the vehicle near the start of a swath path and prepares to engage the vehicle navigation system, the system must quickly determine if a swath path has been stored in system memory or can be calculated from a swath path stored in system memory and then direct the vehicle to the closest, presumably most appropriate path. If no swath paths are stored in the system memory data exists, then the system must alert the operator and direct the recording of a new swath path or allow the operator to provide a stored swath path from another memory source (i.e., change the removable memory media to one having stored swath path information). The size and arrangement of some fields is such that manually traversing and recording a new swath path is both inconvenient and inefficient, especially if only a single end position on a straight-line path is needed and the opposing side of the field is far from the vehicle's present location.

It would be a great advantage to provide a method and apparatus for creating curved swath patterns for use by a vehicle navigation system that streamlines data storage requirements to reduce demands on the storage and computational elements of the navigation system thereby reducing hardware expense of the vehicle guidance system. Further advantages would be realized if the method and apparatus for creating curved swath patterns for use by a vehicle navigation system was capable of storing path positional data for new paths while the system was engaged in other activities, such as automatic guidance along existing paths so that additional, unproductive travel to memorize points on another path is minimized. Still further advantages would be realized if the method and apparatus recognized vehicle/implement limitations in following a defined path and adjusted such paths accordingly. Still further advantages would be realized if the apparatus were capable of receiving periodic adjustments to the position signal and accurately altering generated paths to account for signal drift. These and other advantages are provided by the method and vehicle guidance system described below.

SUMMARY OF THE INVENTION

Accordingly, it is an object of the present invention to provide a GPS-based vehicle guidance system with a series of paths defining swaths that are generally parallel to an initial swath.

It is another object of the present invention to provide a GPS-based vehicle guidance system that can memorize and store an initial swath path to be used to generate successive swath paths, whether the initial swath path is memorized during an actual traversing operation or recalled from a stored swath path.

It is another object of the present invention to provide an efficient GPS-based vehicle guidance system that determines the positional data points to store to limit required data storage capacity, improve computational efficiency, and avoid certain known computational issues.

It is a further object of the present invention to provide method and apparatus for creating curved swath patterns for use by a vehicle navigation system that can be adjusted while in operation to account for signal drift in the GPS position signal.

It is a further object of the present invention to improve system performance by providing a method for limiting the total number of swath paths stored in memory that balances the number of stored swath paths with the time required to recalculate swath paths that are not stored in memory.

It is a still further object of the present invention to provide a method and apparatus for generating curved swaths that is capable of simultaneously storing position data points for one or more swath paths and providing the position data points for another swath path to a vehicle guidance system for automatic vehicle guidance along a swath path.

It is a still further object of the present invention to provide a method of adjusting a baseline swath path to accommodate a variety of implements having differing swath widths.

It is a still further object of the present invention to provide method and apparatus for determining an array of generally parallel paths for an agricultural vehicle positioning system that is durable in construction, inexpensive of manufacture, carefree of maintenance, easily assembled, and simple and effective to use.

These and other objects are achieved by providing method and apparatus for defining a desired series of generally parallel paths and communicating the desired path definition information to a vehicle guidance system.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Any reference herein to the terms "left" or "right," "up", or "down," or "top" or "bottom" are used as a matter of mere convenience, and are determined by standing at the rear of the vehicle facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems, it should be appreciated that the teachings are equally applicable to guidance systems using other methods to determine vehicle position.

Figure 1:
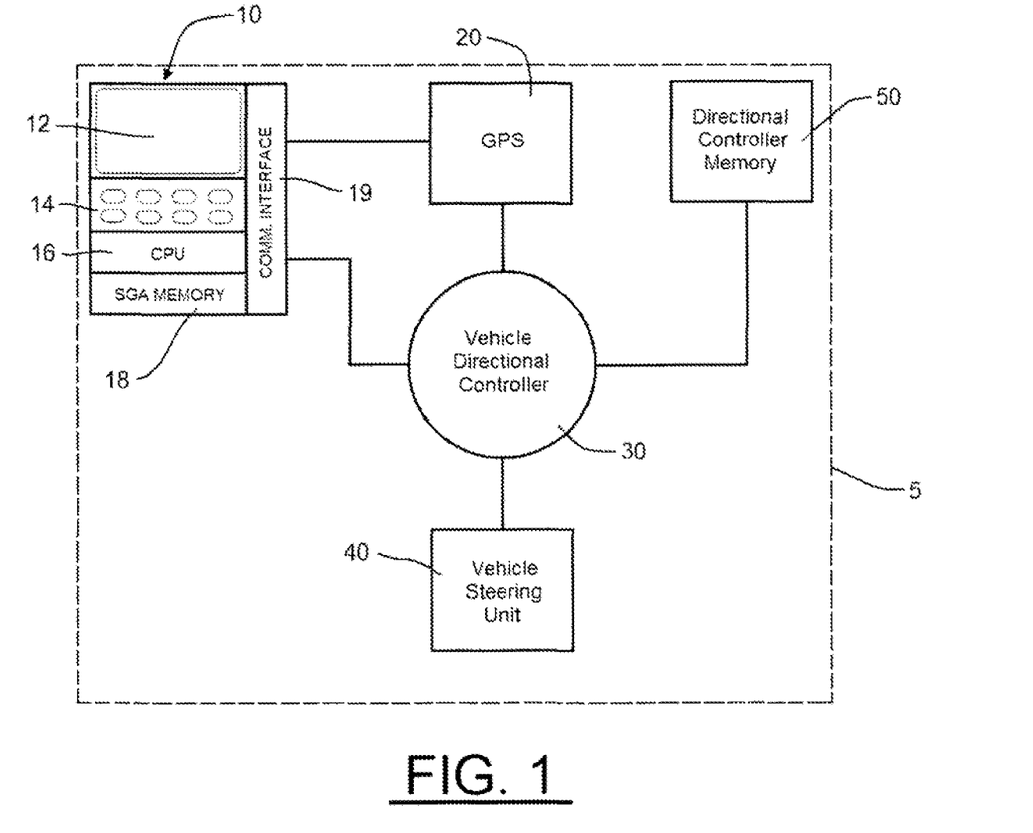
FIG. 1 shows a schematic diagram for a typical GPS-based vehicle guidance system of the type the present invention is useful.

An automatic GPS-based vehicle guidance system 5, seen schematically in FIG. 1, is of the type commonly used in agricultural and construction operations and is located on an agricultural tractor or similar prime mover to simplify the task of driving the vehicle. The vehicle guidance system 5 is located on a tractor and includes a directional controller 30, a global positioning system receiver (GPS) 20, a swath generation apparatus (SGA) 10, and a steering unit 40 communicatively coupled in a manner that enables each to send and receive data and/or control signals. The steering unit 40 preferably includes proportional or directional control valves that are hydraulically connected to a steering actuator for the tractor. The vehicle guidance system 5 continually calculates a vehicle steering heading by comparing vehicle position and directional heading to a desired travel path provided by the SGA 10, and sends the vehicle steering heading to the steering unit 40, which in turn actuates vehicle steering (i.e., steered wheels), thereby changing the vehicle heading. The vehicle navigation system 5 may further include other sensors, such as vehicle yaw and roll, implement hitch angle, and the like, which would also be communicatively coupled to the vehicle guidance system 5 and adjust the vehicle position signal to compensate for such vehicle movements. Though shown as discreet devices, the functions of the directional controller, swath generation apparatus, and other portions of the vehicle guidance system can easily be integrated into a single apparatus within the intent of this invention.

The directional controller 30 is typically a microprocessor-based apparatus that receives near real-time position information from the GPS 20, compares the then-current vehicle position with the intended position along a swath path (provided by the SGA 10), and directs an output signal to the vehicle steering unit 40 to cause the vehicle to be steered toward the intended position. The vehicle guidance system 5 shown is representative of numerous GPS-based vehicle guidance systems in which a SGA 10 incorporating the present invention may prove useful.

The SGA 10 is preferably mounted inside the operator compartment of the tractor to be easily accessible to the operator. The SGA 10 preferably includes a visual display 12 and an operator input device 14 to enable the operator to interface with the vehicle guidance system 5, and a microprocessor 16, an SGA memory 18, and a communication interface 19 that allows the SGA 10 to communicate with other components of the vehicle guidance system 5. The operator input device 14, of which examples include keyboards, touchpads, joysticks, and the like, may be integrated into the visual display 12 (e.g., a touch-screen) so that task-specific "keys" can be easily provided in a compact format or modified by software changes. The SGA memory 18 preferably comprises a removable memory media for all or a portion of the total SGA memory that allows stored swath path information to be conveniently moved and shared among multiple vehicles or with other computer system (i.e., an office computer system). When removable media is utilized, the SGA memory 18 may function as yet another variation of the operator input device 14. The SGA 10 provides computational capability thereby allowing the directional controller 30 to be dedicated to the task of guiding the vehicle along a desired swath path determined by the SGA 10. The primary task of the SGA 10 is to memorize a baseline swath, efficiently store the position data for points along the baseline swath path, generate additional, generally parallel swath paths that, in the aggregate, define a swath pattern that covers the crop growing area of a field, and efficiently communicate the swath path information, as needed, to the directional controller 30. The SGA 10 is also tasked with accepting operator inputs that may require changes to a baseline swath path and efficiently recreating a revised baseline swath path from which other swath paths may be created.

The SGA 10 is configured to receive information about the field to be processed from the operator and to selectively transmit the swath path definition information to the directional controller 30. Input information may include field information (e.g., name, location, size, and boundary locations), the operations to be performed, the implements to be used while processing the field, and the geometry of each implement. Input information may be manually input via the operator input device 14, but is more conveniently transferred into the SGA using a removable module for the SGA memory (e.g., a portable memory card) so that the operator can select from stored information. Information can be entered into portable memory cards by numerous means, including computers which offer greater ease and efficiency for such operations compared to performing them while seated in the vehicle ready to commencing farming operations. An alternate embodiment uses common wireless technology to transmit general input information and a baseline swath path definition to the SGA further enhancing the SGA's ability to share stored swath path information.

With basic information about a field entered, including a baseline swath, the operator may select a desired swath path and swath pattern type from those available in SGA memory 18. Alternatively, the operator may choose to define and store a new swath path and/or swath pattern in the SGA memory. Once a baseline swath is identified or selected, the SGA 10, in accordance with its internal programming, will create a swath pattern comprising a series of additional swath paths that will, as a whole, define a series of swaths that, based on specific vehicle and implement characteristics, cover substantially all of the crop growing area of a selected field. In the preferred embodiment of the present invention, not all swath paths are created and retained in SGA memory. The method used in the present invention creates a limited number of the total number of swath paths needed and then, based on movement of the vehicle in the field, calculates additional swath paths when needed. As the vehicle is positioned near an end of a swath and the vehicle guidance system is engaged, information defining the desired swath path is communicated by SGA 10 for use by the directional controller 30 to manage vehicle movement along the desired path. The rate of communication of swath path information may be varied so that SGA 10 provides swath path position data points at an optimal rate for the directional controller used in the vehicle guidance system.

Figure 2:
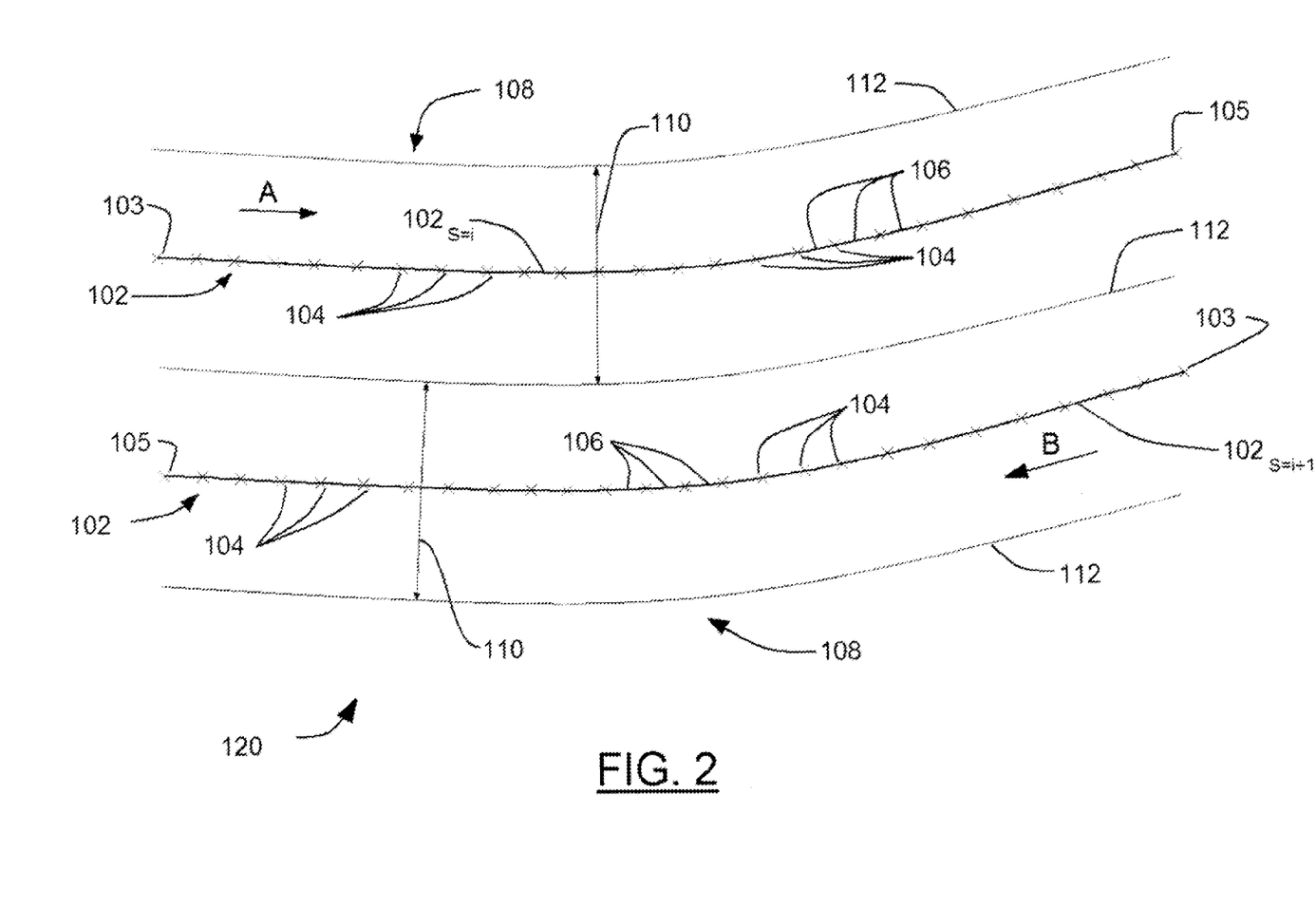
FIG. 2 shows a portion of a pair of swath paths and illustrates the nomenclature used in the curved swath path generation method and apparatus of the present invention.

Referring now to FIG. 2, there is shown a portion of a typical curved swath arrangement in a field. A swath 108 is created when an implement having an effective working (swath) width 110 traverses a swath path 102 over the ground. The implement may be a single-use self-propelled unit or may be pushed, towed, or otherwise connected to a prime mover traversing the swath path 102. Swaths 108 are defined by a plurality of position data points 104 spanning from a beginning position 103 to an end position 105. Swath segments 106 connect adjacent pairs of position data points 104 along each swath path 102. A swath pattern 120 is comprised of one or more swaths arranged so that substantially all of the tillable area of a field is covered by the swaths 108, shown as swath paths $102_{S=i}$ and $102_{S=i+1}$. In an agricultural application, a farmer typically processes a field in long swaths, turning at the end of a first swath after having traversed the swath, and returning to the starting end of the field along a second swath path that may be adjacent to the first swath path depending upon the swath pattern used. If the farmer processes the field topographically (contour plowing), a curved path typically defines each swath. As they move through the field, the tractor and the implement will create a distinct swath pattern through the field. The object is for the swath pattern to cover as much of the crop planting area of the field as is practical while minimizing the portions of the area that are covered multiple times.

Straight-line swath paths in a pattern of generally parallel swaths are the simplest form. The initial swath path definition requires identifying two points, generally the beginning 103 and end 105 points of a first swath 102, designated as S=1, having a single swath segment 106 therebetween. Upon identification of these position data points, internal programming within the SGA 10 will generate a series of swath paths transversely spanning (i.e., generally perpendicular to the direction of vehicle travel) the defined field boundary. Each swath path may be designated as S=i where i ranges from 1 to n and n is the total number of generated swath paths needed to transversely span the field. As each straight-line swath path may be defined by only two position data points, data storage and numerical computation demands are minimal and do not impose significant demands on the SGA 10 processing and storage resources.

Swaths containing one or more curved portions require additional actions by the SGA 10 since the number of position data points 104 needed to define a swath path 102 are increased. Swath paths may be memorized by driving a vehicle along a first swath path while recording position data points along the way. Swath paths may also be defined remotely (e.g., from a location other than on a vehicle) using detailed maps or by storing position information from earlier passes over a field and stored in the SGA memory 18 incorporating a removable media that allows the information to be readily used by multiple vehicles relying on the present swath generation apparatus. Upon reaching a field to perform an operation the operator enters information identifying the field, implement, and operation to be performed via operator input device 14 of the SGA 10. If no swath information is available, the operator will be directed to manually drive and store information defining the first swath path, S=1, into memory. If the swath has been previously stored, the SGA 10 recalls the swath information and proceeds with swath generation.

The present invention also allows new swath path information to be stored to SGA memory while the SGA is engaged (automatically tracking) another swath path. For example, the starting and end points for a new straight-line swath path could be stored to SGA memory while the vehicle is being automatically guided around the perimeter of a field. Once the headland swath pass is completed, information for a new baseline swath path bounded by the headland swath would then be available for the SGA to create a series of swath paths covering the area within the headland swath. In the absence of this capability, the operator could be forced to direct the vehicle to the starting and end points of a new interior baseline swath path after completing the headland perimeter swath, requiring additional, non-productive vehicle travel.

Each subsequently generated swath path $102_{S=i+1}$ is offset from the adjacent swath path $102_{S=i}$ by the effective working width 110 (swath) in an iterative manner resulting in an array of swath paths, each having a shape slightly different from the one from which it was generated. Once generated by the SGA, the swaths may then be communicated to and used by the vehicle navigation controller. Many systems determine the path by computing a parallel path an integral number of implement widths from the initial path (S=1) so that the initial path remains the baseline. In the present invention, each subsequent swath path (S=i+1) is offset from the swath path immediately adjacent thereto (S=i) using a perpendicular offset method. By calculating the offset from the adjacent swath path, minor swath path adjustments that an operator may introduce will be carried through to the subsequently created swath paths. This approach also causes the curvature of each path to differ slightly from the adjacent path from with it was created, especially in areas where the radius of curvature equals the minimum turning radius of the vehicle and its associated implement. Changes in shape from one swath path to the next occur as the radius of curvature is increased or decreased to maintain the edges of the swath close together. Cases in which the radius of curvature is decreasing from one swath path to the next may eventually reach the minimum turning radius limit of the vehicle and associated implement. When this limit is reached, the subsequent swath path curvature will have a different shape than the swath path from which it was generated and there will be gaps between adjacent swath in the area of minimal radius curvature.

Figure 3:
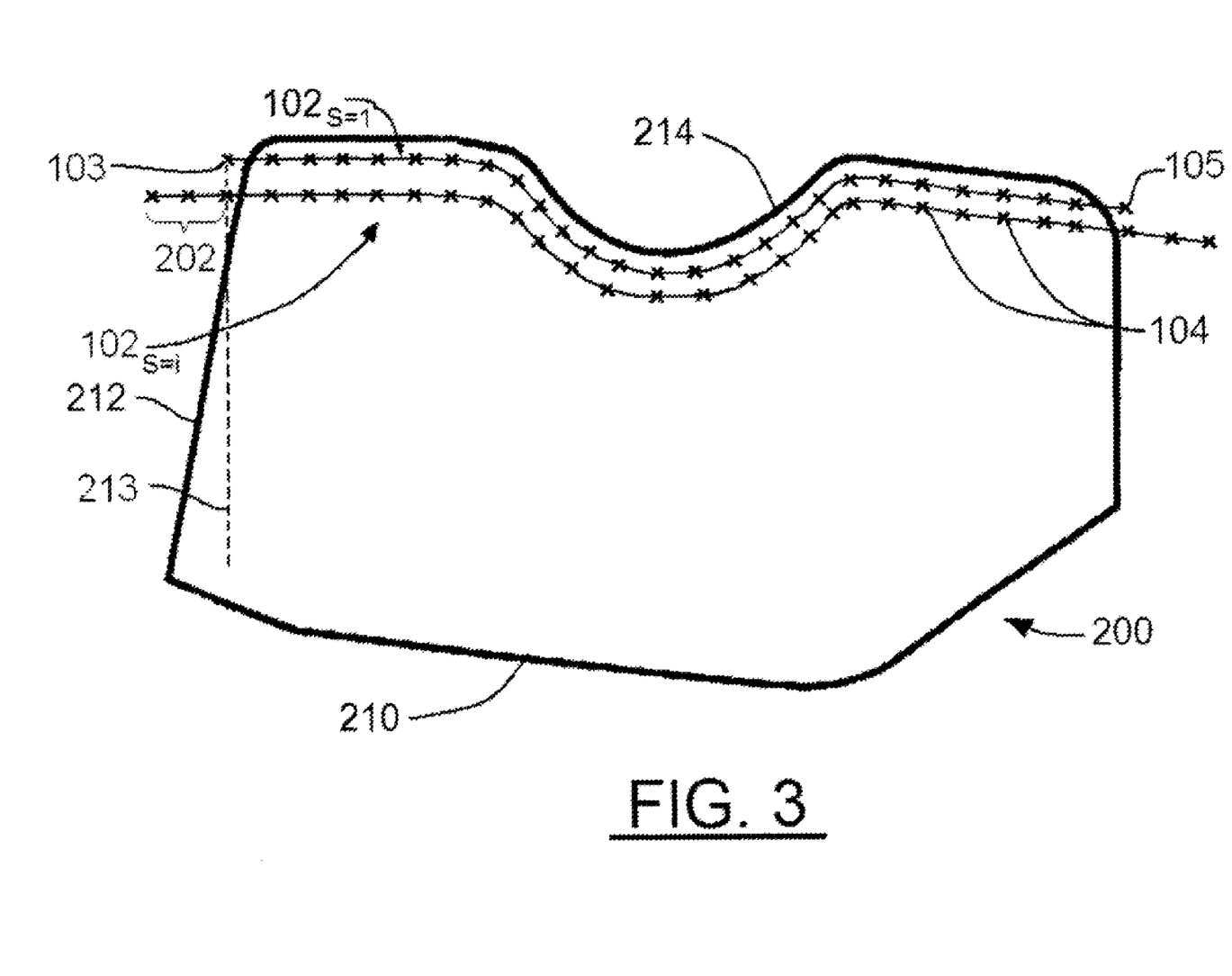
FIG. 3 illustrates a baseline and subsequent curved swath paths in a field with individual position data points shown.
Figure 4:
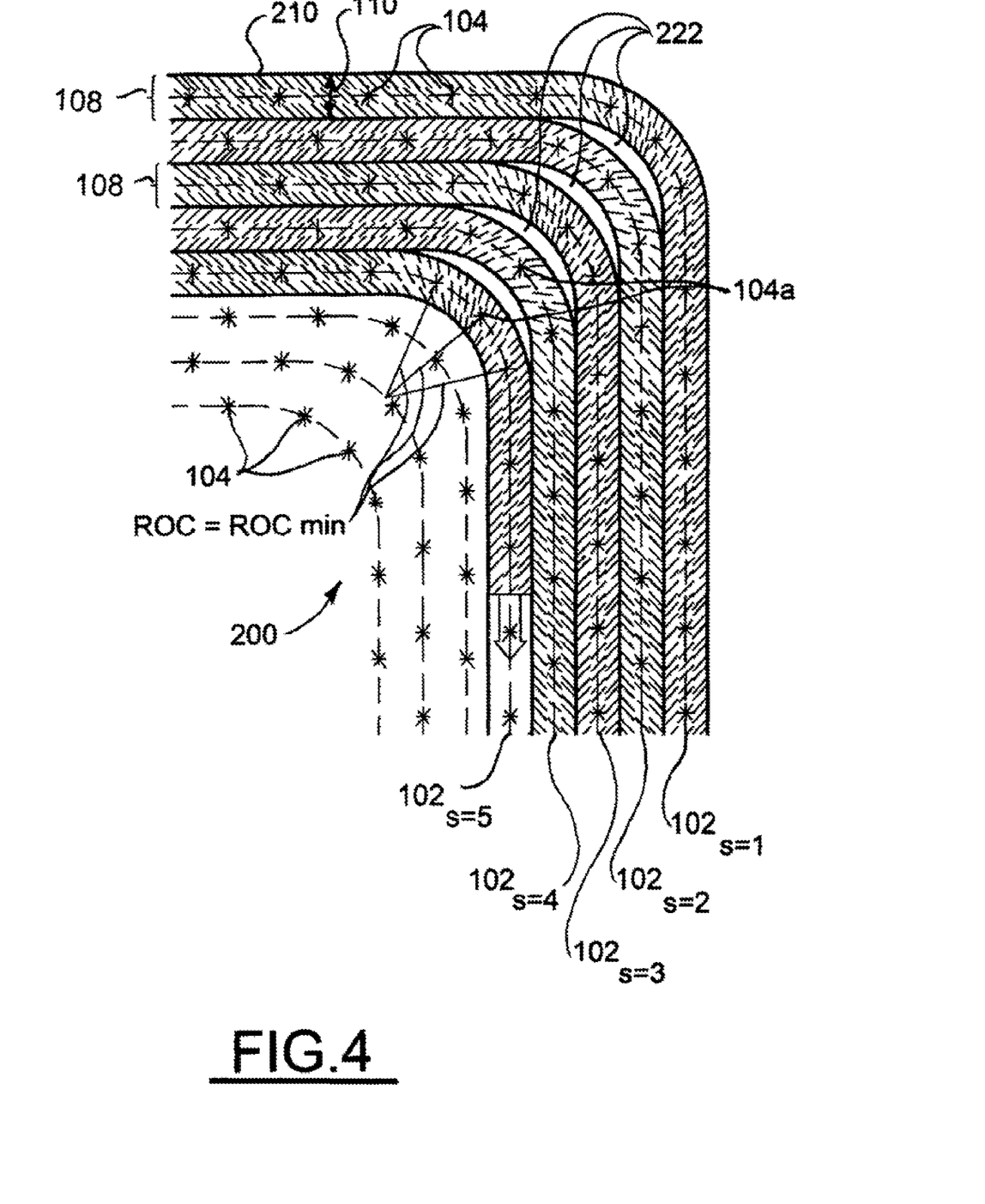
FIG. 4 illustrates some typical swath paths showing coverage gaps caused by minimum turning radius limitations.

Referring to FIGS. 3 and 4, a typical field 200 bounded by a perimeter 210 is shown. A baseline swath path $102_{S=1}$ having a series of position data points 104 is shown in FIG. 3 extending across the field 200, following the irregular boundary 214 of perimeter 210. End boundary 212 illustrates a common problem in swath generation, that of a portion of a field perimeter that requires extending the length of later-generated swath paths in order for the paths to reach the field perimeter 210.

Programming instructions executing in the CPU 16 of the SGA 10 generate the additional swath paths $102_{S=i}$ (only one is shown) from initial swath path $102_{S=1}$ needed to cover the entire area of field 200. The ends of the recalled swath path $102_{S=1}$ are extended beyond the original beginning 103 and end 105 points so that each subsequently generated swath (S=i+1) is longer than the swath from which it is calculated (S=i). Extending the length of each swath assures that generated swath paths $102_{S=i}$ have sufficient length to account for irregularities in the field boundary so that a vehicle traversing a swath path will not reach the end of the swath generation apparatus defined swath path prior to reaching the field boundary. This is illustrated by line 213 in FIG. 3 which shows the location of the ends of the generated swaths if no extensions were made. Each swath path end is extended by a pre-defined amount, balancing an anticipated amount of boundary irregularity with information storage requirements for the additional swath definition information. Extensions are determined using straight-line interpolation from the outermost two position data points on each end of the swath.

Path definition for efficient system performance requires balancing the number of position data points needed to provide the desired directional control input to the directional controller 30 against the burden on the computing and memory systems resulting from working with large amounts of positional data. Typical satellite-based systems calculate position at a fixed time interval, generally around 5 Hz. Storing data for path position at this rate would require vast resources and burden system computations by using unnecessarily closely-spaced data points to define paths. Such closely-spaced positional data points do not proportionally improve the system path-following capability. The recalled baseline swath path $102_{S=1}$ is optimized for the number of position data points 104 defining the swath path $102_{S=1}$. The present invention optimizes computational efficiency by limiting the number of position data points on a swath path 102 such that position data points 104 are spaced at least one meter apart and not more than twenty-five meters apart along the swath path 102. Excess position data points are removed from recalled swath paths having position data points spaced more closely than necessary. Additional position data points are created for swath paths having position data points spaced further apart than the target spacing using linear extrapolation between adjacent points. For agricultural applications spacing in the present invention is further limited to between approximately three and ten meters to provide sufficient curve definition for input to the vehicle guidance system.

During swath recording, the SGA 10 receives position input from the GPS receiver 20 in the vehicle guidance system 5 (typically at 5 Hz). GPS position data is received in geodetic form. For computational ease since swath width is usually defined in units of length the position data is converted to Cartesian coordinates within the SGA 10. Internal programming in the SGA 10 then discards position data points until the swath path is defined by a series of data points of the desired spacing interval. As shown in FIG. 3, the baseline path $102_{S=1}$ is thus defined by a series of positional data points 104 along the swath path from beginning point 103 toward first swath end point 105. A second swath path $102_{S=i}$ (i is equal to 2 in this case) is derived by offsetting the position data points from initial path $102_{S=1}$ by the swath width 110 using a perpendicular offset from each data point in the baseline swath path $102_{S=1}$.

As can also be seen in FIG. 4, the location of baseline swath path $102_{S=1}$ may be affected by changes in the swath width 110, especially when the field perimeter 210 is defined by an obstruction, such as a fence. Upon receiving a swath width input different from the swath width on which the baseline swath path was developed, the operator may direct the SGA 10 to remark (shift laterally) the recalled baseline swath path to account for the change in the swath width so that an obstruction along the perimeter of the field 210 is avoided. The shifted baseline swath path is then stored as a new baseline swath path for use with the selected implement.

Having established a baseline swath path $102_{S=1}$ with the desired spacing of position data points, the SGA 10 compares the radius of curvature (ROC) for each position data point 104 along the swath path to minimum turning radius for the vehicle and associated implement. The ROC for each position data point is determined from at least three adjacent position data points 104 (a triplet) including the position data point being evaluated. The ROC is determined by calculating the radius of a circle intersecting the three adjacent data points being evaluated. Curved portions of each swath path 102 are defined as at least three points along an arc of a circle so that the number of data points for adjacent swath paths remains substantially the same. Normally a recorded swath path 102 should not have turns with radius of curvature less than the minimum turning radius of the vehicle/implement. Problems arise when a recalled baseline swath path $102_{S=1}$ was recorded with a vehicle/implement combination having a smaller minimum radius than the implement presently in use or as the created swath paths converge near the middle of a perimeter-bounded field. In such cases, the swath path, $102_{S=i+2}$ in FIG. 4, is corrected so that the swath path includes no arcs having a radius less than the minimum turning radius of the vehicle/implement. Corrected swaths will have skips or gaps 222 in the coverage of the swath pattern in regions surrounding the swath path correction. Swaths in which two or more adjacent data points cause a radius of curvature to be less than ninety percent of the minimum turning radius limit cannot be corrected. In such circumstances, the SGA 10 alerts the operator that a manual swath correction is required.

When a triplet having a radius of curvature less than the minimum turning radius limit ($ROC_{min}$) is identified, the ROC for each position data point within the triplet is calculated. Beginning with the first position data point (referred to as a violating point 104a), the SGA attempts to fit a circle having a radius equal to the turning radius limit ($ROC_{min}$) to the position data points adjacent the violating point such that the circle tangentially intersects the swath path on both sides of the violating point 104a. If the circle does not tangentially intersect the swath path on either side of the violating point, the SGA expands the curvature area to include the next adjacent one position data points on either side of the first triplet examined and again attempts to tangentially fit the a circle into the curvature, repeating the process until a tangential circle having a radius equal to the turning radius limit is identified or until the spacing between the violating points and their adjusted positions exceed approximately twice the value of the turning radius limit. When a tangential circle is identified, the violating points are repositioned to follow an arc of the circle between the tangential intersection points to an adjusted swath path in the curve. This swath path adjustment method results in small gaps 222 in the overall swath coverage pattern for the field.

The recalled swath (S=1) and each subsequently generated swath (S=i) must be tested to see if the swath path crosses (intersects) itself. Generating subsequent swaths from a path that crosses itself causes problems in that a single position in the field could have multiple swaths paths crossing that position. The vehicle guidance system will generally engage the swath path closest to the vehicle's then-present position, which may not be the swath the operator intended to engage. Crosses in swaths also create areas in a field that are covered multiple times by the vehicle/implement; planting, fertilizing, and spraying operations are typically optimized for a single pass over a particular area of the field. Testing for crosses is an efficient method for preventing swaths from covering a portion of the field multiple times. Computational efficiency is also promoted since once a swath path is checked for crosses (and adjusted, if necessary), subsequent swath paths generated from the original swath path need not be checked to see if they intersect themselves. It is also desirable to eliminate even "near" crosses since they will also lead to problems detecting the closest swath path to the vehicle. Any swath path that loops to within approximately one swath width from another portion of itself is handled by the system as though the path is crossed. This will allow "pseudo-spiral" curves to be generated, which are similar to spirals, except the operator must re-engage automatic after each rotation, since swath paths will end with each rotation due to a near-cross condition.

Figure 5:
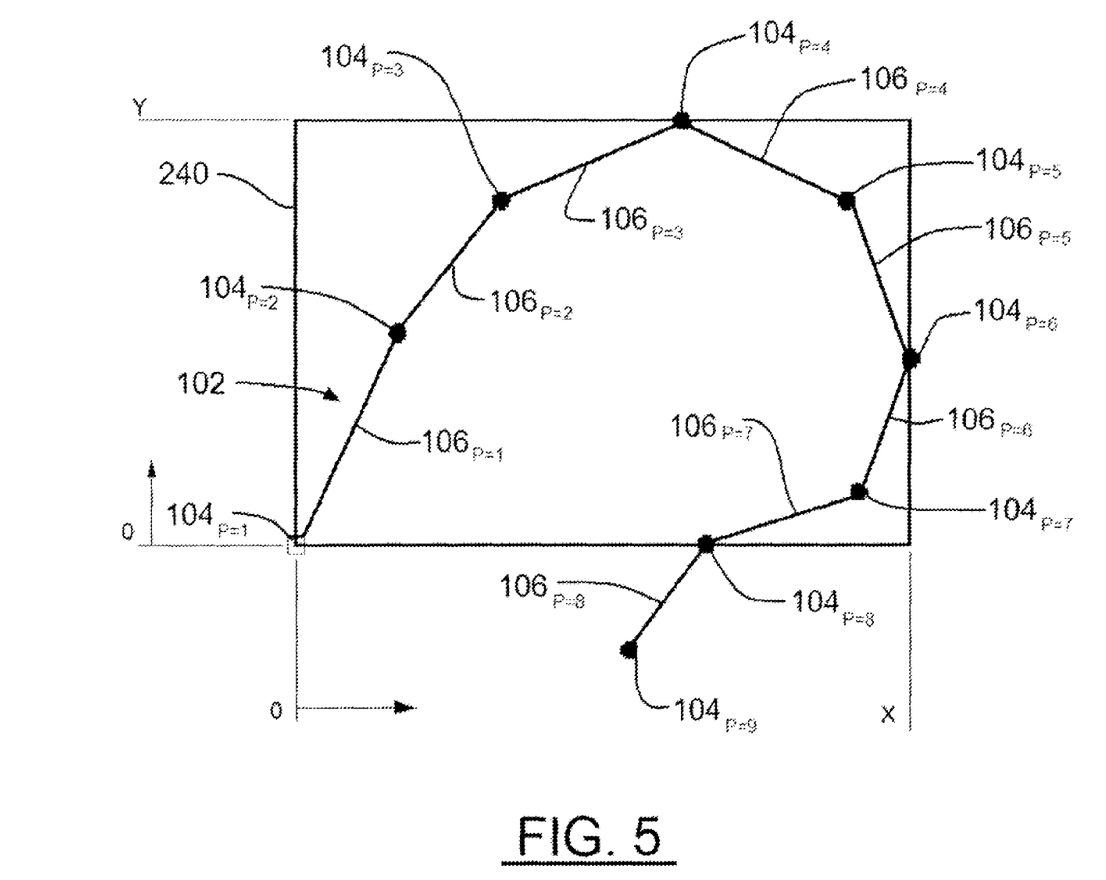
FIG. 5 illustrates the method for checking for the presence of intersections in a single swath path.

Referring to FIG. 5, wherein a portion of a swath path is shown, the SGA tests for crosses in the baseline swath path 102 using an sequential approach that considers the possibility of a cross for each swath path segment $106_{p=n}$ (i.e., swath path between two adjacent position data points) along the swath path 102. The entire length of the swath path 102 will be checked commencing with a first segment $106_{P=1}$ at one end and progressing toward the other, generally following the direction of travel used when the swath path was first recorded. The second swath path segment $106_{P=2}$ does not need to be tested against the first segment since it cannot cross. Commencing with the third segment $106_{P=3}$, an examination area 240 is designated around swath path segments. Examination area 240 is defined using a Cartesian coordinate system as having a minimum and maximum value in the X direction and a minimum and maximum value in the Y direction derived from the extreme-most position data points. As each new segment is added to the evaluation group, the size of examination area 240 is checked for changes in the X and Y values. In swath paths having no crosses, each new segment should expand the size of the examination area by establishing new bounding absolute values for X and/or Y based on the added position data points.

If the new swath path segment is outside of the examination area, then the most recent segment added is confirmed to not to cross any of the other swath path line segments. This is illustrated in FIG. 5 by swath path segments $106_{P=1}$ through $106_{P=6}$. The inclusion of each successive segment up through segment $106_{P=5}$ causes examination area 240 to expand indicating that the swath path does not cross or nearly cross itself in the first five segments. However, the inclusion of swath $106_{P=6}$ which has an end point at position data point $104_{P=7}$ does not cause the examination area 240 to expand since point $104_{P=7}$ is located within the examination area defined by the first five swath path segments indicating that the possibility of a cross exists and must be further examined.

If a swath path segment is not entirely outside the examination area (i.e., at least a portion of the path segment lies within the examination area), then the segment must be tested against each and every swath path segment previously tested back to the beginning of the swath path. All the previous segments must be tested regardless of whether the segments were inside or outside of the examination area defined up to the potentially crossing segment (the examination area defined up to segment $106_{P=6}$ in FIG. 5) when they were initially tested. Swath path segments $106_{P=6}$ and $106_{P=7}$ both fall within the examination area defined up to the time they were included in the examination and must therefore be check to see if they cross or nearly cross each preceding path segment. Swath paths determined to cross themselves must be modified before subsequent swath paths are created therefrom. Position data points located between the cross location and both ends of the swath path are deleted from the swath path definition to prevent problems with swath paths created from the modified and previously crossed swath path. This will ensure that these swaths will not overlap or cross existing swaths.

Each swath path segment should also be tested for the existence of near crosses. A simple range check calculating the minimum and maximum X position value and minimum and maximum Y position value for each of the swath path segments is performed to see whether any two swath path segments fall within approximately one swath width of each other. Upon a first detection of a near cross in a particular direction (left or right) of the baseline swath path, all of the position data points along the swath path following the position data point of the near cross are deleted. Swath paths generated by the SGA from a baseline path in the particular direction will be based on this shortened swath. Once a generated swath path has a near cross in a particular direction and subsequently generated swath paths are found to have near crosses, all position data points towards both ends of the swath path from the point of the near cross are deleted such that the resultant swath path takes the form of a loop. This will ensure that these swaths will not overlap or cross existing swaths. No further cross checking is required on the swath path. Eventually, curves within the generated swath paths will become too tight and the radius of curvature test will fail. No further swath paths will be created in the direction of swath path generation.

If no crosses in the swath path were detected, then SGA checks the total heading change of the swath path. The total heading change is calculated by determining a directional heading for each pair of consecutive position data points in the swath path and creating a running total of the heading changes along the length of the swath path. If the total heading change is less than or equal to 180 degrees, the swath path does not cross itself; it may then be used for swath path creation. In the event the total heading change of the swath path is greater than 180 degrees, the swath path may be unsuitable for subsequent swath path generation. In such circumstances, both ends of the swath path are extended by a defined amount of at least the total length of the swath path and the checks for crosses and near-crosses re-performed. If no crosses or near-crosses are detected in the second check, the swath path is suitable baseline for swath path generation.

Figure 6:
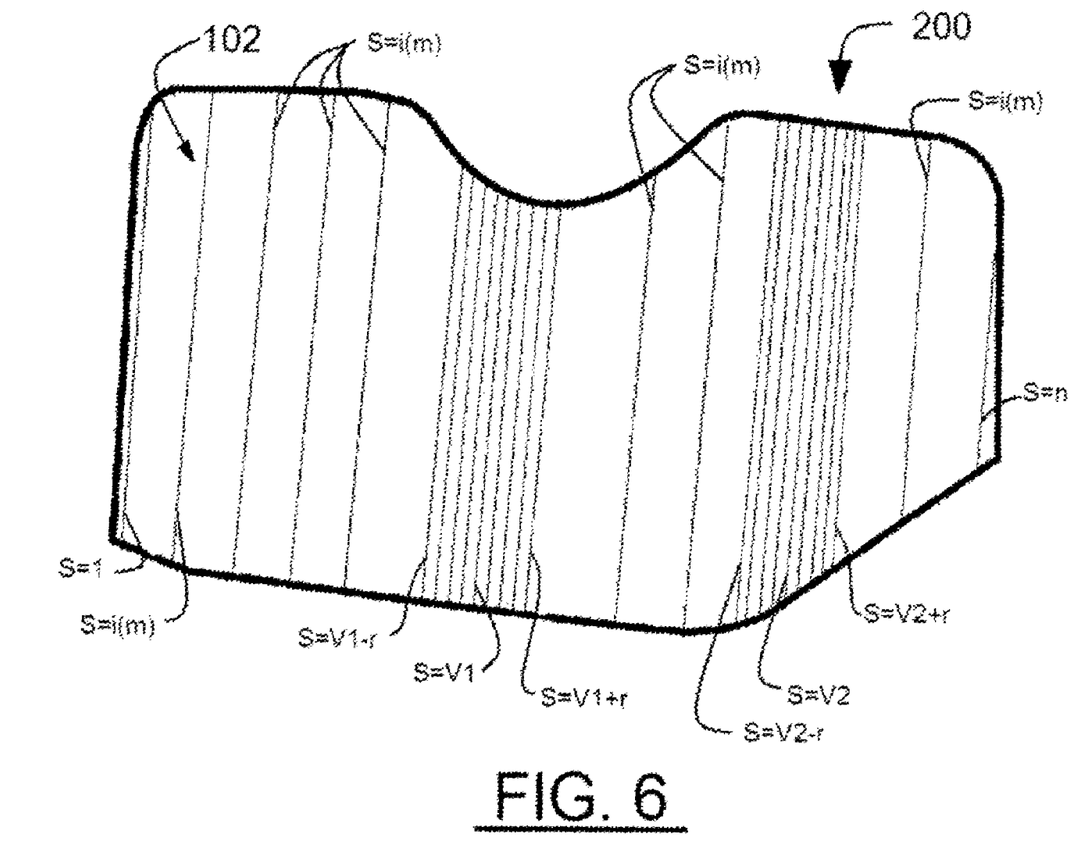
FIG. 6 illustrates the method for limiting the number of swath paths retained in the system.

Now referring to FIG. 6, a field 200 requiring a large number of swaths to cover the crop planting area is shown. After a recalled swath path has been checked for position data point spacing, radius of curvatures and crosses, the SGA 10 will generate swath paths to be communicated to the navigation system 30 for automatically steering the vehicle. The total number of individual swaths, which may be designated as S=n, in the swath pattern vanes with the size and shape of the field, implement characteristics, and general swath pattern. Fields of large size may require many swaths in order to completely cover the area of the field which results in large quantities of information describing the curved swaths.

In order to limit the amount of swath information the SGA 10 needs to store in memory 18 at any one time, the SGA 10 limits the number of swath path definitions retained in memory to those swaths in the vicinity of the vehicle and periodic swaths across the remainder of the field. Swaths in the vicinity of the vehicle are the most likely to be selected by an operator and thus readily available for selection without imposing any delay while swath path are calculated. As illustrated in FIG. 6, if the vehicle is located at a first position, near swath S=v1 the SGA generates a range of adjacent swath paths on either side of the vehicle. These may be designated as swath paths between S=v1−r and S=v1+r. In the event the operator moves the vehicle to a different portion of the fields the SGA 10 can easily calculate the missing swath paths between those swath paths that were saved to fill in the gap between the periodic swath paths that were stored in memory. In the illustration, the operator repositions the vehicle to a second position near swath S=v2, and the SGA recalculates swath paths in the range of the vehicle position, shown as swath paths between S=v2−r and S=v2+r. Only a limited number of swath paths outside of the range are retained in SGA memory, designated as S=i(m); if other swath paths are needed, the SGA recalculates the swath paths from the nearest (in the direction of the baseline swath path S−1) stored swath path. One objective of this approach is to maintain a range of pre-calculated swath path within the SGA memory where they may be quickly recalled and engaged by the SGA and directional controller. As the vehicle progresses across a field, the range of readily available swath paths shifts along with vehicle position so that a range of pre-calculated swath paths surrounding the vehicle is always available in the SGA so that the operator can select and engage (or the SGA may automatically engage) a swath path without a computational delay. In the preferred embodiment of the present invention, the range of swath paths on either side of the vehicle position is approximately ten and may be varied in either direction to optimize the balance between computational and memory storage capability of the SGA. This range of swath paths is calculated and stored in memory. Outside of the ten swath path range, only approximately every tenth swath path is stored. In the illustration, the stored swaths could be designated as S=i(m) or, more conventionally as a series such as S=1, S=10, S=20, and S=30 for as many are needed to span the field. In the event the vehicle is moved to a portion of the field more than ten swaths away from a given position, the system need only calculate no more than eighteen swath paths in order to have ten swath paths on either side of the then-present vehicle location.

Figure 7:
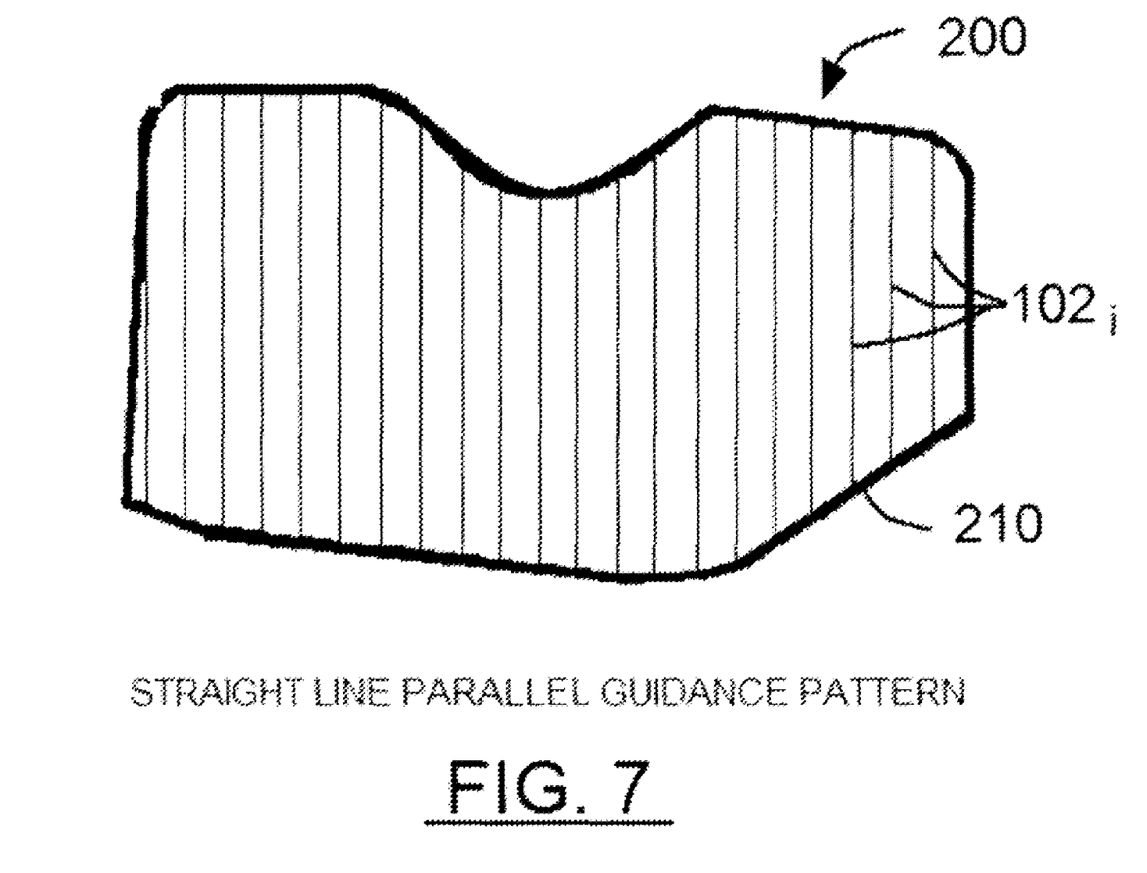
FIG. 7 illustrates typical swath paths for a vehicle guidance system using a parallel swath path pattern to cover a land area.
Figure 8:
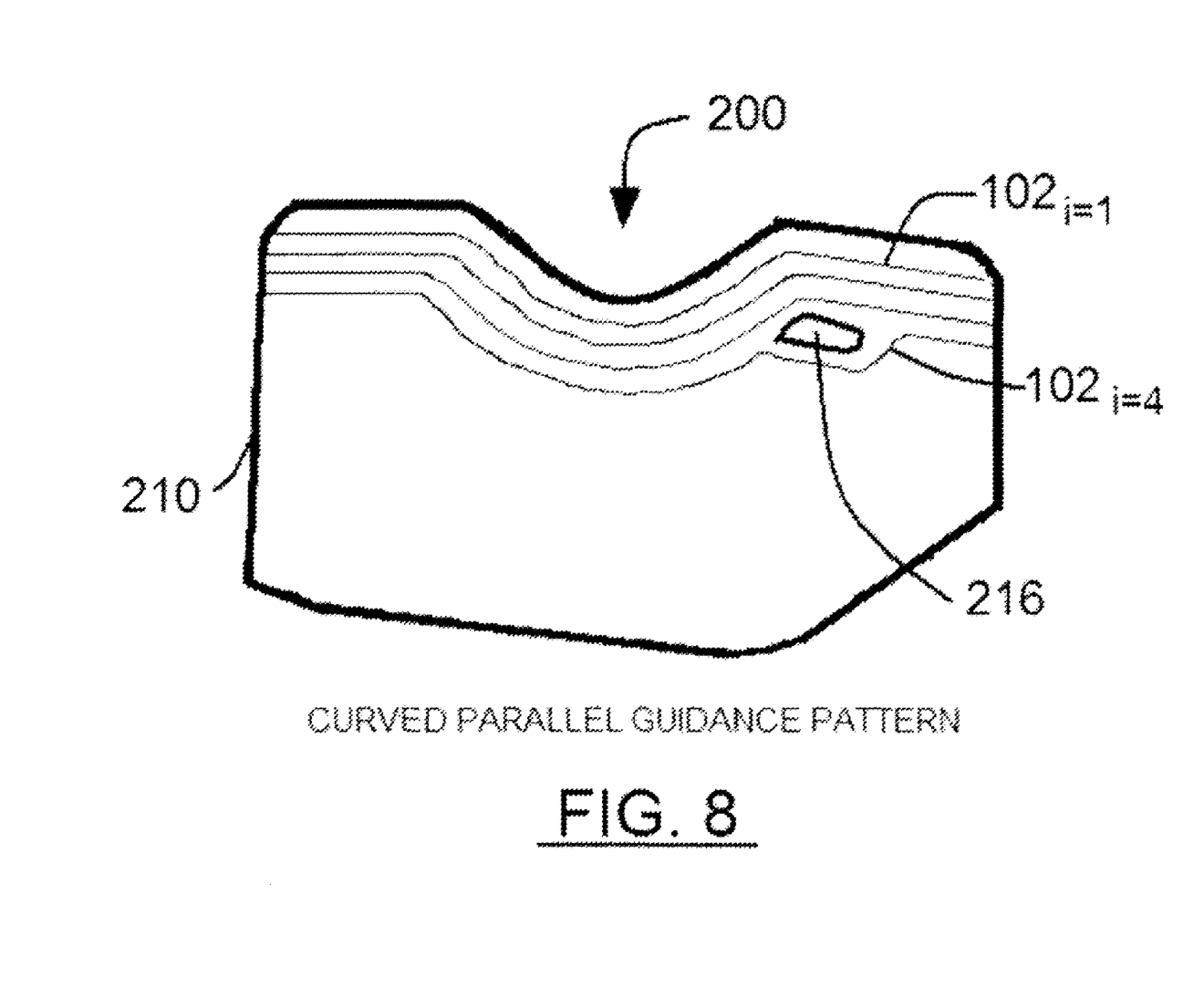
FIG. 8 illustrates the swath paths for a vehicle guidance system using a curved parallel swath path pattern to cover the land area.

Referring now to FIGS. 7 through 10, common swath patterns used in agricultural operations are shown. A land area, or field 200, is shown defined by an outside perimeter 210. The field may contain agricultural crop or the like and thus require periodic traverse by an agricultural implement. The field perimeter 210 is irregular and typical of conditions likely to be encountered during most agricultural operations. As shown in FIG. 8, field 200 may also include one or more obstacles 216, such as trees, rocks, or other obstructions, within the perimeter whose position must be provided to a navigation controller 30 by the SGA 10 so that path alterations can be calculated and the obstacles avoided. On systems lacking automated steering control, the vehicle directional control is accomplished by an indicator (i.e. light bar), that shows how far left or right the vehicle's location is to the desired path and allows the operator to input the necessary steering corrections. Most systems have the capability to pause and suspend automated directional control, typically accomplished by manually turning the steering wheels to allow the operator to leave a field mid-swath or to allow manual end of swath row turning.

FIG. 7 illustrates a straight-line parallel path swath pattern comprising a series of generally parallel swath paths $102_i$ which span the width of the field 200. An operator would typically begin at a first swath path (i=1) and traverse along the path. Upon reaching the opposite side of the field, the operator would turn the vehicle in preparation for a second pass along an adjacent swath path (i=2) separated by a distance generally equal to the width of the implement being used. The vehicle continues this pattern automatically following each swath path until the swaths generated by the swath paths reach the opposite side of the field. As the vehicle traverses the series of swath paths, the implement will cover substantially all of the field area.

In FIG. 8, field 200 is shown having a curved parallel swath path guidance swath pattern. Such swath paths are useful in fields having irregularly shaped perimeters 210 or when topographic contour planting is desired. In topographic contour planting, crop rows are arranged to follow a generally constant elevation line in a field, often requiring numerous curved sections in the swath path. Similar to straight-line parallel swath paths, subsequently generated swath paths are offset from an initial swath path by an effective implement width. Unlike parallel straight-line paths that require only two position data points to define, curved paths may require many position data points to define.

As can be seen in FIG. 8, the fourth swath path $102_{i=4}$ requires alteration to avoid obstacle 216. The vehicle will not be able to follow fourth path $102_{i=4}$ in an automated mode without intervention; the operator is usually required to disengage the automatic path following mode of the SGA, steer around the obstacle while recording the deviation, and then re-engage the automatic path following mode once the vehicle returns to the original path. The operator can also traverse the obstacle 216 without recording a swath path alteration. Using this approach, the next swath path would be generally parallel to the previous un-altered swath path and could direct the vehicle through the obstacles requiring multiple manual passes around the obstacle until the original series of swath paths no longer intersect the obstacle. This approach could result in multiple passes over the same portion of the field which may or may not be problematic. Alternatively, the operator could record the altered path thereby allowing subsequent swath paths to include the redirected swath path around the obstacle 216 that would be carried through subsequently generated swath paths.

Figure 9:
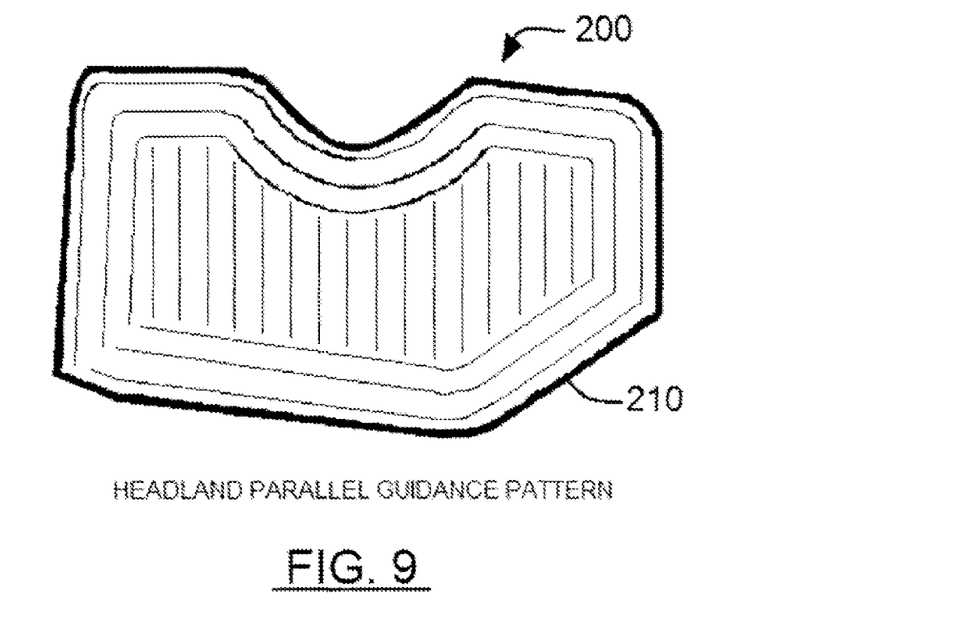
FIG. 9 illustrates the swath paths for a vehicle guidance system using a circumferential headlands with interior parallel swath path pattern to cover the land area.
Figure 10:
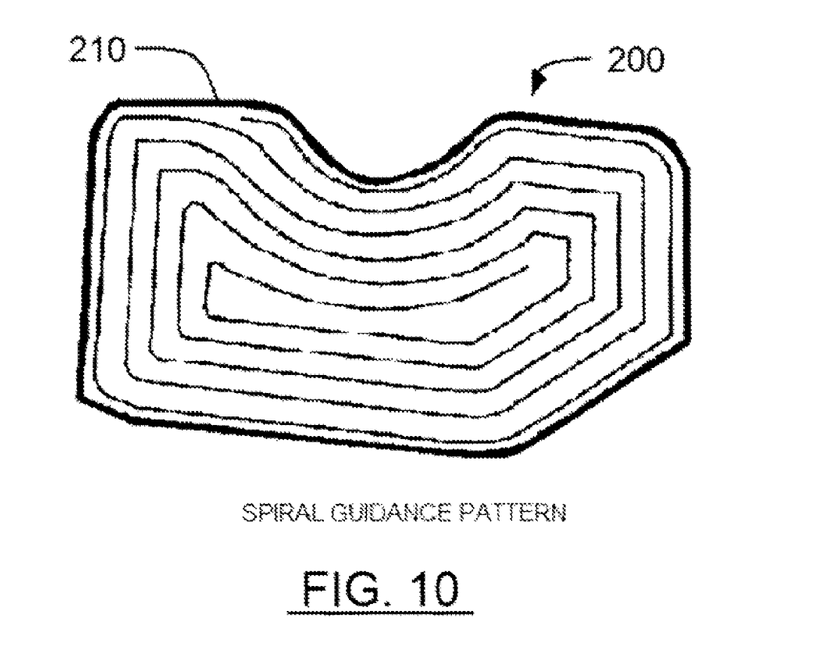
FIG. 10 illustrates the swath path for a vehicle guidance system using a spiral swath path pattern to cover the land area.

FIGS. 9 and 10 show two additional commonly used swath patterns for covering a field. FIG. 9 shows a headland pattern with parallel paths while FIG. 10 shows a spiral guidance pattern which is similar to the headland path except that each successive swath path is offset by a swath width. Each of these patterns use similar guidance methods as those described for straight-line and curved parallel path patterns.

During operation, the operator positions the vehicle near the beginning of a defined swath path, commonly displayed on screen 12 of the SGA 10. The system selects the closest swath path so that when the operator engages the automatic vehicle guidance system 5, the vehicle will begin along the swath path. Alternatively, the operator may override the system selection and choose another swath path to traverse using the keyboard 14 or touch screen 12 of the SGA 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. An iterative method for creating curved swath paths from a baseline swath path for use in an agricultural vehicle guidance system comprising the following steps: providing a vehicle with an associated implement; providing a vehicle guidance system having a vehicle position receiver; providing a swath generation apparatus (SGA) having a processing capability and an SGA memory device, the SGA being communicatively coupled to the guidance system; providing an operator input device; communicating a swath width to the SGA; communicating a baseline swath path to the SGA, the baseline swath path having at least three spaced apart position data points defining a first curvature and a baseline length; and creating by the processing capability of the SGA by an iterative process, at least one adjacent swath path generally parallel to the baseline swath path and spaced apart from the baseline swath path by the swath width, the at least one adjacent swath path having a second curvature slightly differing from the first curvature; extending within the SGA the baseline length by defining a first and a second extension for the baseline swath path, the first extension having at least one position data point positioned in line with the starting point and one immediately adjacent position data point along the baseline swath path, the second extension having at least one position data point positioned in line with the ending point and one immediately adjacent position data point along the baseline swath path; designating within the SGA the endmost position data points of the first and second extensions as the starting point and ending point of the baseline swath path and adjusting the baseline length based thereupon; creating within the SGA the at least one adjacent swath path having a series of spaced apart position data points, each position data point of the adjacent swath path being adjacent to and separated from adjacent position data points of the plurality of position data points on the baseline swath pattern by a swath width, and having a swath path length substantially equal to the adjusted baseline length; and extending within the SGA the swath path length of the at least one adjacent swath path by defining at least one additional position data point for each end, each at least one position data point being positioned in line with the two end most adjacent position data points on the end of the swath path, and repeating the steps for each adjacent swath path created such that the swath path length of each adjacent path is longer than the swath path from which it is created.

2. The method of claim 1, wherein the communication to the SGA is accomplished by the operator input apparatus.

3. The method of claim 1, wherein the SGA further comprises an SGA memory.

4. The method of claim 3, wherein the SGA memory comprises a removable memory media containing information representing the swath width and the baseline swath path.

5. The method of claim 1, further comprising the steps:
communicating a minimum turning radius for the vehicle and associated implement to the SGA;
determining within the SGA a radius of curvature for each series of at least three adjacent position data points in the baseline swath path;
comparing within the SGA the radius of curvature for each series of at least three adjacent position data points to the minimum turning radius; and
adjusting one or more of the at least three adjacent position data points for which the radius of curvature is substantially less than the minimum turning radius so that curvature in the baseline swath path has a radius of curvature equal to or greater than the minimum turning radius.

6. The method of claim 1, further comprising the step:
selecting within the SGA, from the plurality of position data points, a subset of the plurality of position data points having at least three position data points wherein adjacent position data points in the subset are spaced apart by a position spacing interval and connected by a path segment, and designating the subset of points as a baseline swath path, the baseline swath path having a starting point and an ending point spaced apart by a baseline length.

7. The method of claim 6, wherein the position spacing interval is greater than approximately one meter.

8. The method of claim 6, wherein the position spacing interval is less than approximately twenty-five meters.

9. The method of claim 6, wherein the position spacing interval is in a range between three and ten meters.

10. The method of claim 1, further comprising the steps:
creating within the SGA by an iterative process, a plurality of generated adjacent swath paths, each generated adjacent path of the plurality being created from the swath path immediately adjacent commencing with the baseline swath path, each subsequently created swath path having a curvature, and each subsequently created path curvature differing from the curvature of the swath path used to create the subsequent swath path;
selecting within the SGA a limited number of swath paths from the plurality of adjacent swath paths; and
storing the limited number of swath paths in the SGA memory.

11. The method of claim 10, further comprising the steps:
positioning the vehicle at one end of a first swath path and giving the first swath path its own designation, $S_{v1}$;
limiting the number of swath paths stored in the memory to include a range of swath paths proximate to the vehicle position, and designating a value for the number of swath paths in the range as r, whereby the range of swath paths is represented as $S_{v1-r}$ to $S_{v1+r}$; and
retaining within the SGA memory a limited number of swath paths outside of the range of swath paths, including the baseline swath path, whereby the total number of swath paths stored in the SGA memory is less than $S_n$.

12. The method of claim 11, wherein the value of the range (r) is at least one.

13. The method of claim 11, wherein the value of the range (r) is ten.

14. The method of claim 11, wherein the limited number of swath paths outside the range of swath paths is less than twenty-five percent of the swath paths outside the range of swath paths.

15. The method of claim 11, wherein the limited number of swath paths outside the range of swath paths is approximately every tenth swath path outside the range of swath paths.

16. The method of claim 14, wherein the limited number of swath paths outside the range of swath paths is approximately every tenth swath path outside the range of swath paths.

17. The method of claim 1, further comprising the steps:
communicating a lateral shift in the baseline swath path via the operator input device to the SGA; and
adjusting the baseline swath path based on the lateral shift and storing the adjusted baseline swath path as the baseline swath path.

18. The method of claim 1, wherein the SGA may simultaneously communicate the at least three position data points of a first swath path to said vehicle guidance system, receive at least one new position data point for a second swath path from the receiver, and store the at least one new position data point for a second swath in the SGA memory.

19. The method of claim 1, further comprising the step:
selecting within the SGA, from the plurality of position data points, a subset of the plurality of position data points having at least three position data points wherein adjacent position data points in the subset are spaced apart by a position spacing interval and connected by a path segment, and designating the subset of points as a baseline swath path, the baseline swath path having a starting point and an ending point spaced apart by a baseline length.

20. The method of claim 19, wherein the position spacing interval is in a range between three and ten meters.

21. The method of claim 19, further comprising the steps:
communicating a minimum turning radius for the vehicle and associated implement to the SGA;
determining within the SGA a radius of curvature for each series of three adjacent position data points in the baseline swath path;
comparing within the SGA the radius of curvature for each series of three adjacent position data points to the minimum turning radius; and
adjusting one or more of the at least three adjacent position data points for which the radius of curvature is substantially less than the minimum turning radius so that curvature in the baseline swath path has a radius of curvature equal to or greater than the minimum turning radius.

22. The method of claim 21, further comprising the steps:
creating within the SGA by an iterative process, a plurality of generated adjacent swath paths, each generated adjacent path of the plurality being created from the swath path immediately adjacent commencing with the baseline swath path, each subsequently created swath path having a curvature, and each subsequently created path curvature differing from the curvature of the swath path used to create the subsequent swath path;
selecting within the SGA a limited number of swath paths from the plurality of adjacent swath paths; and
storing the limited number of swath paths in the SGA memory.

23. The method of claim 22, further comprising the steps:
positioning the vehicle at one end of a first swath path and designating the swath path as $S_{v1}$;
limiting the number of swath paths stored in the memory to include a range of swath paths proximate to the vehicle position, and designating a value for the number of swath paths in the range as r, whereby the range of swath paths is represented as $S_{v1-r}$ to $S_{v1+r}$; and
retaining within the SGA memory a limited number of swath paths outside of the range of swath paths, including the baseline swath path, whereby the total number of swath paths stored in the SGA memory is less than $S_n$.

24. The method of claim 23, wherein the limited number of swath paths outside the range is approximately every tenth swath path.

25. The method of claim 23, wherein the value of the range is at least one.

26. The method of claim 23, wherein the value of the range is approximately ten.

27. A method for creating curved swath path from a baseline swath path for use in an agricultural vehicle navigation system comprising the steps: providing a vehicle with an associated implement; providing a vehicle guidance system having a vehicle position receiver; providing a swath generation apparatus (SGA) communicatively coupled to the guidance system; providing an operator input device; communicating a baseline swath path to the SGA, the baseline swath path having a plurality of spaced apart position data points defining a first curvature and a baseline length, each pair of adjacent position data points defining a swath path segment there between; and determining by the SGA in accordance with its programming if the baseline swath path intersects itself; the steps: defining a beginning point and an ending point of the baseline swath path, the beginning and end points located at opposing ends of the baseline swath path; defining within the SGA a first rectangular examination area bounding a group of three consecutive position data points along the swath path, commencing with the beginning point, the first examination area bounded by sides having minimum and maximum x-axis values defining a first x-axis range and minimum and maximum y-axis values defining a first y-axis range, the first ranges of the x-axis and y-axis values determined by positions of the extreme most position data points in the group, defining within the SGA a second rectangular examination area commencing with a fourth position data point, designating the fourth position data point as the incremental data point, and continuing iteratively for each consecutive position data point along the swath path to the end point, the second examination area bounded by sides having minimum and maximum x-axis values defining a second x-axis range, and minimum and maximum y-axis values defining a second y-axis range, the second ranges of x-axis and y-axis values determined by positions of the extreme most position data points in the group including the incremental data point; comparing within the SGA the first x-axis and y-axis range and the second x-axis and y-axis range; when the at least one of the ranges is increased by the inclusion of the incremental data point, designating with the SGA that the swath path from the beginning point to the incremental data point, that the swath path does not cross itself, designating the second examination area as the first examination area and the second x-axis and y-axis ranges as the first second x-axis and y-axis ranges, designating the next consecutive position data point on the swath path in the direction toward the end point as the incremental data point, comparing changes in x-axis and y-axis ranges in an iterative manner for each consecutive position data point along the swath path to the end point; when neither the second x-axis range or the second y-axis range is increased by the inclusion of the incremental data point, designating within the SGA that the swath path may cross itself examine every swath path segment positioned between two adjacent position data points commencing at the beginning point and continuing to the incremental data point to determine if the swath path intersects itself, and defining within the SGA a total heading change for the swath path as the summation of heading changes for each swath path segment comprising the swath path; designating within the SGA the swath path as having no crosses when the total heading change is less than or equal to 180 degrees; when the total heading change is greater than 180 degrees, examining within the SGA the swath path to determine if it intersects itself.

28. The method of claim 27, further comprising the steps:
for swath paths determined to intersect themselves, deleting from the plurality of position data points selected position data points between the beginning point and the intersecting point of the swath path; and
deleting selected position data points between the intersecting point and the end point of the swath path from the plurality of position data points.

29. An apparatus for defining curved swath paths in a crop growing area of a field for a use with a vehicle guidance system for a vehicle and associated implement, said apparatus comprising: a receiver for a vehicle position signal, said receiver providing a location output signal representing the location of said vehicle; a vehicle directional controller communicatively coupled to said receiver and a vehicle steering apparatus; a swath generation apparatus (SGA) having a digital electronic processor, an SGA memory, an operator input device, a visual display, and software for directing actions to be performed by the digital electronic processor, SGA memory, operator input device, and visual display in the SGA, said SGA being communicatively coupled to said receiver and said vehicle directional controller whereby said SGA is capable of iteratively creating a plurality of curved swath paths, each swath path having a curvature and a plurality of position data points spaced-apart by a spacing interval, each of said plurality of swath paths having curvature differing slightly from an adjacent swath path, said SGA storing a limited number of said plurality of curved swath paths, and communicating said plurality of position data points of a selected swath path to said vehicle directional controller thereby causing said vehicle and associated to be guided along said selected swath path, the limited number of stored swath paths is less than approximately 25% of said plurality of curved swath paths.

30. The apparatus of claim 29, wherein said SGA memory comprises a removable media.

31. The apparatus of claim 29, wherein said SGA may simultaneously communicate said plurality of position data points to said vehicle directional controller, receive at least one new position data point for a second swath path from said receiver, and store said at least one new position data point for said second swath path in said SGA memory.

32. The apparatus of claim 29, wherein said SGA software, in response to a defined input for minimum turning radius, limits said curvature of each swath path to not less than said minimum turning radius.

33. The apparatus of claim 29, wherein said SGA software limits said number of said plurality of position data points for each swath path by adjusting said spacing interval.

34. The apparatus of claim 33, wherein said spacing interval is between approximately three and ten meters.

35. The apparatus of claim 29, wherein the limited number of stored swath paths outside the range (r) is approximately every tenth swath path.

36. The apparatus of claim 29, wherein the selected number of stored swath paths includes approximately every tenth swath path of the plurality of curved swath paths and a range of adjacent swath paths proximate to the vehicle position.

37. The apparatus of claim 36, wherein the range of swath paths proximate to the vehicle position is approximately ten on each side of the vehicle.

* * * * *